(Model.)
W. D. SLAUSON.
POWER FOR BALING PRESSES.
No. 319,858. Patented June 9, 1885.
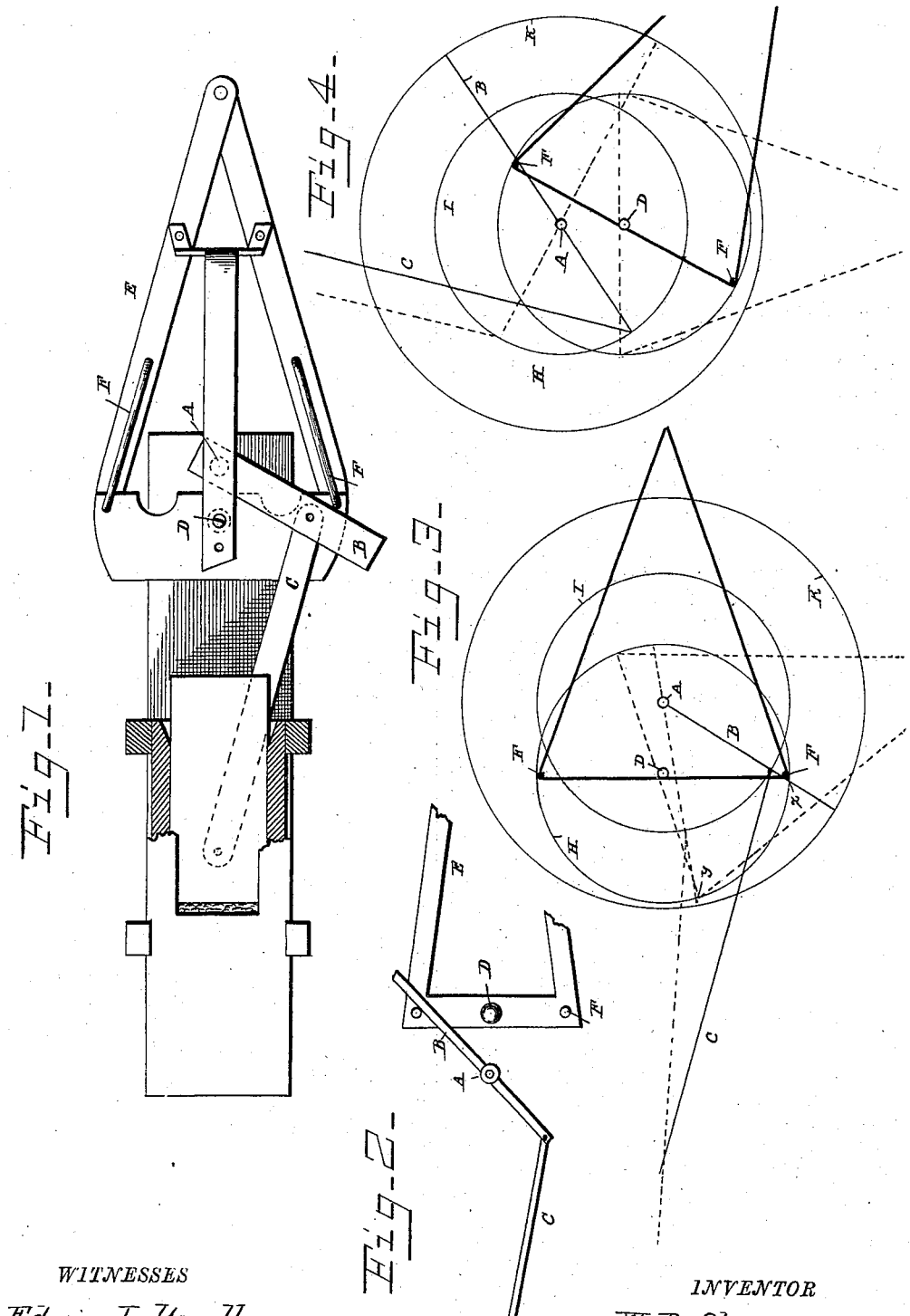
WITNESSES
Edwin L. Yewell.
Chas. D. Davis
INVENTOR
W. D. Slauson.
By W. N. Alexander
Attorney

UNITED STATES PATENT OFFICE.

WILLIS D. SLAUSON, OF RACINE, WISCONSIN.

POWER FOR BALING-PRESSES.

SPECIFICATION forming part of Letters Patent No. 319,858, dated June 9, 1885.

Application filed April 27, 1885. (Model.)

*To all whom it may concern:*

Be it known that I, WILLIS D. SLAUSON, a citizen of the United States, residing at Racine, in the county of Racine and State of Wisconsin, have invented certain new and useful Improvements in Powers for Baling-Presses, of which the following is a specification, reference being had therein to the accompanying drawings.

My invention relates to improvements in mechanical powers adapted, especially, to hay or other presses, and designed to produce a device in which there is a constantly-increasing resultant force as the material is being pressed from an equally-applied power.

In describing the device reference is had to the annexed drawings, in which Figure 1 represents a plan view of the mechanism constituting the power; Fig. 2, a diagram showing another method of applying the principle, and Figs. 3 and 4 diagrams showing the operation of the device.

To or on a pivotal post, A, is secured an arm or arms, B. To the arm or between the arms is pivoted a connecting arm or pitman, C, at a distance from the free ends of said arm or arms, and operating the plunger of the press. In the frame of the machine, and between the plunger and the post A, is the pivotal point D of the main lever E. This lever is V-shaped, the wide end being the one that is pivoted at D. On the said wide end, and preferably on a line with the pivot, are stops F. In Fig. 2 the lever is pivoted in front the post A, and the stops engage with an extension of the arms B on the opposite side of the post A. In Fig. 3 the circle H shows the line of travel of the stops F on the main or horse lever. The circle I shows the line of travel of the pivotal connection of the arms B and the pitman C, and the circle K the line of travel of the free end of the arms B. At the position of the main lever, as shown in full lines, it will be seen that the stops F engage with the arms B at $x$. By advancing the lever to the position shown in dotted lines, it will be seen that the stop F has traveled to $y$, thus gaining in leverage the difference between $x$ and $y$, and this gain in leverage, and hence in power, is accomplished as the resistance of the material being packed increases. The arms and pitman act as a toggle. In Figs. 2 and 4 the arm B extends on both sides the pivotal point, and the stops F pull on the free end, instead of pushing, as in Figs. 1 and 3. The operation is otherwise exactly similar.

I claim—

1. A pivoted arm or arms having an extended free end, in combination with a connecting-rod pivoted to said arm or arms and a lever pivoted to one side of the pivotal point of the arm or arms, substantially as and for the purpose specified.

2. A lever with a pivoted broad end having stops thereon, in combination with an arm or arms pivoted to one side of the lever-pivot, and having an extended free end, and a connecting-rod or pitman pivoted to the said arms, substantially as and for the purpose specified.

3. A V-shaped lever pivoted at its broad end and provided with stops thereon, in combination with an arm or arms pivoted to one side the pivotal point of the lever, and a connecting-rod or pitman pivotally secured to the arm or arms at a distance from the free end thereof, substantially as and for the purpose specified.

In testimony whereof I affix my signature in presence of two witnesses.

WILLIS D. SLAUSON.

Witnesses:
C. R. CARPENTER,
L. R. CLEMENTS.